(12) United States Patent
Cain et al.

(10) Patent No.: US 8,462,124 B2
(45) Date of Patent: Jun. 11, 2013

(54) ELECTRONIC DOCUMENT READING DEVICE

(75) Inventors: Paul Cain, Cambridge (GB); Tim Yeoh, London (GB)

(73) Assignee: Plastic Logic Limited, Cambridge (GB)

( * ) Notice: Subject to any disclaimer, the term of this patent is extended or adjusted under 35 U.S.C. 154(b) by 377 days.

(21) Appl. No.: 12/304,469

(22) PCT Filed: Aug. 10, 2006

(86) PCT No.: PCT/GB2006/050235
§ 371 (c)(1),
(2), (4) Date: Apr. 6, 2009

(87) PCT Pub. No.: WO2007/144549
PCT Pub. Date: Dec. 21, 2007

(65) Prior Publication Data
US 2010/0066685 A1    Mar. 18, 2010

(30) Foreign Application Priority Data
Jun. 12, 2006 (GB) .................................. 0611452.4

(51) Int. Cl.
*G06F 3/041* (2006.01)
*G06F 3/038* (2006.01)
*G06F 13/00* (2006.01)

(52) U.S. Cl.
USPC ........... 345/173; 345/204; 345/156; 345/107; 710/303

(58) Field of Classification Search
None
See application file for complete search history.

(56) References Cited

U.S. PATENT DOCUMENTS

| 5,463,725 | A | * | 10/1995 | Henckel et al. ............... 715/776 |
| 5,961,804 | A |   | 10/1999 | Jacobson et al. |
| 6,021,306 | A |   | 2/2000  | McTaggart |
| 6,124,851 | A |   | 9/2000  | Jacobson |
| 6,297,838 | B1 |  | 10/2001 | Chang et al. |
| 6,628,244 | B1 | * | 9/2003 | Hirosawa et al. ............. 345/2.3 |
| 6,788,292 | B1 | * | 9/2004 | Nako et al. ..................... 345/173 |

(Continued)

FOREIGN PATENT DOCUMENTS

| WO | WO 01/47043 | 6/2001 |
| WO | WO 01/47045 | 6/2001 |

(Continued)

OTHER PUBLICATIONS

International Search Report for Application No. PCT/GB2006/050235, Dated May 31, 2007.

*Primary Examiner* — K. Wong
(74) *Attorney, Agent, or Firm* — Knobbe Martens Olson & Bear LLP (57) ABSTRACT

An electronic document reading device includes an electronic page having at least one display surface and a page support. The page is attached to the page support such that the page is physically turnable. The device also includes a memory to store at least part of a document to be read and a page driver coupled to the memory, to drive the page display surface to display a first stored portion of the document. The device further includes a sensing system to sense turning of the page and an update control system coupled to the sensing system to control update of the display surface with a second stored portion of the document responsive to sensing of the page turning. The update control system is configured to control the updating such that the updating is at least partially hidden from a viewpoint of a user of the device.

33 Claims, 7 Drawing Sheets

U.S. PATENT DOCUMENTS

| | | | |
|---|---|---|---|
| 6,972,752 B2 * | 12/2005 | Nako et al. | 345/173 |
| 7,030,854 B2 | 4/2006 | Baucom et al. | |
| 7,572,667 B2 * | 8/2009 | Ryu et al. | 438/99 |
| 7,733,559 B2 * | 6/2010 | Kawase et al. | 359/296 |
| 7,751,116 B2 * | 7/2010 | Shin | 359/296 |
| 2002/0081560 A1 | 6/2002 | Ka-wah et al. | |
| 2002/0180767 A1 | 12/2002 | Northway et al. | |
| 2004/0135951 A1 * | 7/2004 | Stumbo et al. | 349/139 |
| 2004/0190234 A1 | 9/2004 | Lin et al. | |
| 2004/0201633 A1 | 10/2004 | Barsness et al. | |
| 2004/0212588 A1 | 10/2004 | Moriyama | |
| 2004/0212602 A1 | 10/2004 | Nako et al. | |
| 2005/0151742 A1 | 7/2005 | Hong et al. | |
| 2005/0260551 A1 | 11/2005 | Rubin et al. | |
| 2006/0077190 A1 | 4/2006 | Zhou et al. | |
| 2006/0119615 A1 | 6/2006 | Zhou et al. | |
| 2006/0125802 A1 | 6/2006 | Liang et al. | |
| 2006/0133664 A1 | 6/2006 | Hong et al. | |
| 2006/0139308 A1 | 6/2006 | Jacobson et al. | |
| 2007/0279315 A1 * | 12/2007 | Laves et al. | 345/1.1 |

FOREIGN PATENT DOCUMENTS

| | | |
|---|---|---|
| WO | WO 2004/070466 | 8/2004 |
| WO | WO 2006/056808 | 6/2006 |
| WO | WO 2006/059162 | 6/2006 |
| WO | WO 2006/061658 | 6/2008 |

* cited by examiner

ELECTRONIC DOCUMENT READING DEVICE

CROSS-REFERENCE TO RELATED APPLICATIONS

This application is the U.S. National Phase under 35 U.S.C. §371 of International Application No. PCT/GB2006/050235, filed Aug. 10, 2006, designating the United States and published in English on Dec. 21, 2007, as WO 2007/144549, which claims priority to United Kingdom Application No. 0611452.4, filed Jun. 12, 2006.

FIELD OF THE INVENTION

This invention generally relates to an electronic document reading device, that is to a device such as an electronic book which presents a document to a user on a display to enable the user to read the document.

DESCRIPTION OF RELATED ART

An example of an electronic reading device is described in US2006/0119615. The device uses an electrophoretic display screen divided horizontally into two display regions so that one can be changed whilst the other remains displayed. This document also shows (in FIG. 4c) an example with separate display screens.

Further background prior art can be found in U.S. Pat. No. 6,124,851, US2004/0201633, US2006/0133664, US2006/0125802, US2006/0139308, US2006/0077190, US2005/0260551, U.S. Pat. No. 6,124,851, U.S. Pat. No. 6,021,306, and US20050151742.

There is, however, a desire for improved electronic document reading devices.

SUMMARY OF THE INVENTION

According to a first aspect of the present invention there is therefore provided an electronic document reading device, the device comprising: an electronic page having at least one display surface; a page support, said page being attached to said page support such that said page is physically turnable; a memory to store at least part of a document to be read; a page driver coupled to said memory, to drive said page display surface to display a first stored portion of said document; a sensing system to sense turning of said page; and an update control system coupled to said sensing system to control update of said display surface with a second stored portion of said document responsive to sensing of said page turning; and wherein said update control system is configured to control said updating such that said updating is at least partially hidden from a viewpoint of a user of the device.

Thus in embodiments of the device the sensing system and update control enables the display surface of a page to be updated when partially or substantially hidden from a user of the device, more particularly from a viewpoint of a user viewing the display surface of a page prior to turning of the page.

In general a display surface is updated whilst another is being viewed, but the updated display surface is either partially or wholly turned away from the viewer or is partially or substantially wholly hidden behind another page.

The sensing system may sense the initiation or completion of a turning movement or movement of a page into a turned position. In the case of a double-sided electronic page, however, the sensing system may sense a turning over of the entire reading device. In general, however, a page is turnable or rotatable about the page support and it is this turning which is sensed.

Preferred embodiments of the reading device have two electronic pages each attached to the page support. The sensing system may then sense a relative turning of one page with respect to the other. In this way when a user has completed reading a page and turns the page the turned page may be updated when its display surface (or for a double-sided page, a relevant display surface) is partially or substantially completely hidden. Thus in embodiments the sensing system is configured to sense i) substantial completion of the page turning; and/or ii) when one of said display surfaces is at least partially hidden from a viewer of the other said display surface. The update control system may then be configured to update the at least partially hidden display surface in response to this sensing.

In embodiments of the device the electronic page has two display surfaces on opposite sides of the page to thereby provide a double-sided electronic page. In this case the reverse side of a double-sided page may be updated when a page has been turned over so that the new front side (former reverse side) is viewed. Depending on how far open the book is when the pages are read, this may occur when a page is turned through an angle of at least 90°, 100°, or at least some large angles such as 135° or 170°, for example substantially 180°. Embodiments of the reading device have two double-sided pages in which case the reverse side of a double-sided page (after the page has been turned over) may not be updated immediately on turning the page over. Instead the "reverse" side may be updated when it is once again facing the viewer/user but hidden behind the other page, that is when it has turned through substantially 360°. In this way a user may turn back the page to view again the previously viewed material, the page only refreshing when it has turned through 360° rather than 180°.

In some preferred embodiments as previously mentioned the reading device comprises at least two electronic pages, and each of these may be attached to a respective mount. The mounts may be configured to enable rotation of one page with respect to the other. In embodiments the page mounts may (but need not be) generally tubular or cylindrical; a central axle may or may not be provided. In other arrangements a mount for a page may be, for example, magnetic to, say, allow pages to be detached and turned; or hinged like a "magic wallet".

In embodiments with two electronic pages the sensing system is preferably configured to sense rotation of one page with respect to the other. In some preferred embodiments each page mount includes electronics associated with its respective page, and the electronics in the two mounts is connected by means of a flexible electrical interconnect such as a flexible cable, configured to allow relative rotation of the pages, more particularly of the mounts, by at least 300°, more preferably substantially 360°. Optionally a limiting device may be included to prevent one mount to be turned by more than 360° with respect to the other (although in embodiments the pages themselves substantially prevent this).

The skilled person will understand that in embodiments the reading device may include three, four or more pages, optionally but preferably each with a respective mount, for example to enable rotation about a common axis.

In embodiments of the device a page may be detachable, either from its mount or, with its mount, from the device. More particularly the device, and a page, may each be configured to allow a user to detach and re-attach a page, for example by means of an electrical/mechanical interface. In preferred embodiments the display on a page, such as a detached page is non-volatile. For example in the case of an electrophoretic type display such as E-ink™ the display technology is inherently non-volatile and the detached page may simply comprise the display, including associated driver circuitry, in particular TFT transistors, and an electrical edge connector, but without any associated power supply.

In some preferred embodiments the page support comprises at least one user control, preferably a wheel, which may be mounted about an axis of rotation or turning of the pages. This may operate as a scroll wheel and/or a menu option selection device.

In preferred embodiments the page support contains active electronic components to drive the page display surface. In the case of a flexible page any rigid components that should not be bent may be incorporated into the page support.

As previously mentioned, preferably the electronic page comprises an electro-phoretic display such as E-ink™ and, in some particularly preferred embodiments, the page is flexible. In embodiments with one or more pages a page may roll up within a page mount or support.

In embodiments the display surface may comprise a touch-sensitive surface, to facilitate user interaction with the device. An example of a touch-sensitive electrophoretic display is described in WO 02/073572 (U.S. Pat. No. 7,030,854).

In embodiments a page may include a sensor to sense a bending force on a corner of the page, for example by means of the aforementioned touch-sensing function. The reading device may then include a bookmarking system to bookmark a location in a displayed document responsive to detection of this bending force. Preferably a bookmark symbol displayed with at the bookmarked place in the document. The sensor may sense either actual bending or pressure, for example pressure which, on a flexible screen, would cause bending. In embodiments the sensing may simply sense touching of a corner of the page. Preferably a bookmarking function is provided with a device with at least one flexible page. An electronic bookmark may comprise, for example, a tag stored in a memory of the reading device identifying a bookmarked location in a displayed document.

In embodiments the reading device also includes an interface to a docking station to enable one or both of uploading a document and recharging an internal power source of the reading device, when interfaced to the docking station.

In a related aspect the invention provides a detachable electronic page for an electronic document reading device, said electronic page having an electrical interface for interfacing with said reading device and a connecting portion for detachable coupling with said reading device.

The detachable electronic page may include either a wired or a wireless interface to the docking station for either or both of power and display data. In preferred embodiments the page comprises a non-volatile electrophoretic display and lacks an internal power supply. Preferably the page is flexible.

In a further related aspect the invention provides an electronic document reading device, the device including at least one electronic page having a display, and wherein said device is configured such that a user is able to bookmark a document displayed on said electronic page by applying a bending force to said electronic page.

In preferred embodiments the bending force for bookmarking a displayed document is applied to a corner of the page.

In a still further related aspect the invention provides a docking station for an electronic document reading device, the docking station including an interface for said reading device, and configured to perform one or both of uploading a document to said reading device and recharging an internal power source of said reading device.

Preferably the docking station also includes a processor to manage the interface with the reading device to co-ordinate document transfer and the like. The interface may be wired or wireless. In embodiments a common interface to the reading device, for example a USB interface, may be employed for both data transfer and recharging.

In a further aspect the invention provides an electronic document reading device comprising two electronic pages turnably attached to a page spine, and wherein electronic circuitry of said document reading device is contained within said spine.

In a still further aspect the invention provides a method of updating a display on a turnable page of an electronic document reading device, the method comprising: sensing turning of said page; and updating said display in response to said sensing; and wherein said updating is at least partially hidden from a viewpoint of a user of said electronic reader viewing said page prior to said turning.

In some preferred embodiments the device has at least two display surfaces, for example a double-sided page or two single-sided pages, and the sensing comprises determining when one of the display surfaces is at least partially hidden from a viewer of the other display surface, the method then comprising updating the at least partially hidden display surface in response to the sensing. Generally this will involve reading the next page of display data from memory. In embodiments the device has at least two pages and the sensing determines when one of the pages is substantially hidden behind the other.

The invention further comprises and electronic document reading device comprising means for implementing a method as described above.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

The skilled person will understand that references to a document in the above-described aspects and embodiments of the invention are to be interpreted broadly including a wide range of materials such as newspapers, books, emails, attachments, web pages, other mark-up language documents, written music, images, video, graphical representations of audio, written computer programs and the like.

Broadly speaking, document encompasses any type of material which may be displayed on an electronic page.

As previously mentioned, in embodiments of all of the above aspects of the invention a page or display of the electronic document reading device may comprise an active matrix of organic TFTs (thin film transistors) on an organic, flexible substrate which drives an electrophoretic medium.

Features of aspects of the invention described above, and of embodiments of the above aspects of the invention, may be combined in any permutation.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

We will describe a page refreshing electronic document reader (e-reader) that incorporates two or more electronic pages attached to a spinal column. The two or more displays are integrated by being bound together by the spinal column to allow a page turning motion. Each electronic page is discretely refreshed upon being turned around the central bind of the e-reader. In addition the e-reader preferably incorporates a touch screen which allows for book marking of pages by electronically marking the corner of a chosen page. Further features, such as the addition of a scroll wheel may be attached to the central spine to allow the user to quickly operate a menu system.

The skilled person will appreciate that, although preferred embodiments of our e-reader have two pages, devices with only a single page are also useful, and embodiments of the invention are note limited to having two turnable pages.

Embodiments provide a variety of user friendly, hand-held, electronic reading devices that incorporate a number of operable functions. An electronic reader is generally a handheld electronic device which may be used for example for reading electronic documents, such as newspapers, pdf documents, books, electronic mails and attachments. Embodiments generally comprise a display through which the user accesses the document, a host module which runs document reading software, and loads the correct data into the display, and an interface through which documents can be loaded onto the electronic reader. The electronic reader may comprise other functionalities, such as (but not limited to) touch panel, or other user input functions, personal digital assistant (PDA), digital music player or mobile phone functions.

The display may be a liquid crystal display device or an emissive display, but preferably the display is a reflective display which is easily readable in bright daylight, such as a bistable, electrophoretic display. The display may be a rigid display incorporating a glass substrate, but preferably the display is a flexible display fabricated on a flexible substrate, such as a plastic, thin metal or glass substrate. The display may be a directly driven or passive matrix display, but preferably the display is an active matrix display comprising an active matrix of thin film transistors (TFTs), such as amorphous silicon, polycrystalline silicon or organic TFTs.

We will describe an electronic reader device that incorporates two or more refreshable electronic pages displayed on more than one display. In this specification we generally use the term "refresh" to refer to updating a page display to include this information. We address technological limitations that exist for some display technologies which are of interest for electronic readers, such as electrophoretic displays. Electrophoretic displays do not provide fast refreshing and update capability, which means that after finishing a page there is a problem displaying the next page seamlessly. We will describe a system in which the next page is displayed on a second display in such a way that the second display can be updated whilst partially or substantially hidden while the previous page is being read.

One version of the electronic reader device provides a single unit which integrates two or more displays together in the form of electronic pages, in which a user is able to physically turn the pages of the e-reader. The motion of turning the pages of the e-reader enables each page to refresh as or soon after it is turned. We enable this refreshing process to occur out of sight from the user. The page that is being refreshed is hidden behind the subsequent upper electronic page and so the user is not privy to the refreshing process enabling a smooth page-turning process. The user is able to read text that is stored electronically using this page turning feature which maintains a sequential page reading experience.

To further aid the experience the e-reader preferably incorporates a touch screen display. Such a display provides the user with the ability to book mark pages by simulating the action of folding over the corner of a page. The addition of touch screen capability within the e-reader device enables the user to electronically fold over the corner of an electronic page in order to book mark a chosen page with a book mark symbol therefore allowing for easy reference when scrolling through the pages of the e-reader device. Once it is no longer necessary for the user to maintain the book marked page, the book mark symbol may be turned off.

In a preferred device the electronic reader incorporates two or more electronic pages or display devices bound to a spinal column. In this and the other described embodiments of this and other aspects of the invention the spinal column may be substituted by an alternative page binding. Upon turning over an upper page of the e-reader, said upper page is electronically refreshed, while an underlying page is brought to the surface of the e-reader and is able to be viewed by the user.

In another embodiment the electronic reader incorporates two or more double-sided electronic pages. Upon turning each upper page of the e-reader, said page is discretely refreshed, while the user is viewing a subsequent electronic page of the reader.

In a further embodiment, an electronic reader is provided that, preferably, incorporates two or more turnable electronic pages bound or otherwise coupled to one another to allow turning. Upon downloading the information onto the e-reader, the user is able to detach a page from the main e-reader unit and share the information that has been downloaded onto said electronic page with a second user.

In another embodiment two electronic readers are provided that can be joined together to form a single e-reader unit. Preferably each individual e-reader incorporates one or more turnable single or double-sided electronic pages bound or otherwise coupled to one another to allow turning. Preferably each electronic page of the e-reader is bound together around a central spinal column.

In general embodiments of the present invention provide an electronic reader device that gives the user a page-turning experience. The user is presented with an electronic reader that preferably incorporates two or more electronic pages in the form of display devices that are bound to a central spinal column. The pages of the e-reader can be turned about the central spinal column or other coupling which allows turning. As the upper electronic page of the e-reader is turned over by the user, said upper page is refreshed, while the user is reading the underlying page, which has become the upper electronic page as a result of the turning motion. In this way the user has an enhanced reading experience.

Example 1

Figure 1:
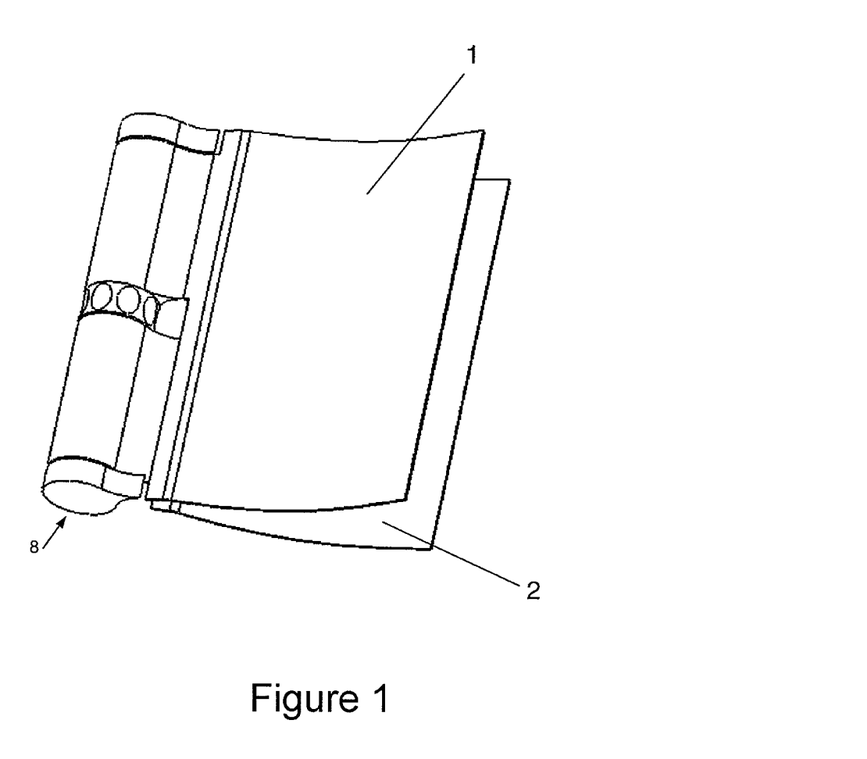
FIG. 1 shows an electronic reader device incorporating two or more displays that are integrated together in the form of electronic pages that can be turned around a central spinal column bind.

An Electronic Reader that Incorporates at Least Two Electronic Pages that are Electronically Refreshed Upon being Turned In a first embodiment, the electronic reader device incorporates two or more displays that are integrated together in the form of electronic pages about a central spinal bind as is shown in FIG. 1. Each display is connected to the central spinal bind in at least one position and in such a way that each electronic page can be rotated about the central spinal bind individually.

Figure 2:
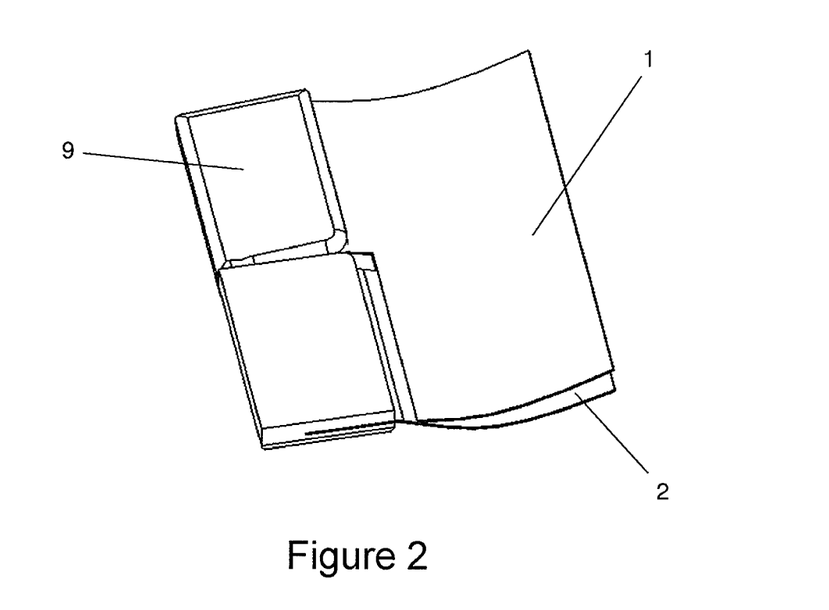
FIG. 2 shows an electronic reader device incorporating two or more displays that are integrated together in the form of electronic pages about a central rectangular block bind.

In a preferred embodiment two or more pages 1, 2 are bound to a central spinal bind or column 8. The central spinal column 8 comprises a number of longitudinal sections as is shown in FIG. 1. These sections both house the driver electronics of the device (of each page) and enable the electronic pages of the e-reader to be turned individually, as is further described below. The central spinal column may be fixed with respect to one of the electronic pages, or it may be turnable with respect to any of the electronic pages. The central spine preferably comprises a (cylindrical) tube as is shown in FIG. 1, but other spinal designs may also be employed. A rectangular block bind 9 is seen in FIG. 2 and is able to be operated in the same way as the spinal column, previously described. The spine is preferably composed of a plastic material, although other suitable materials may be used. In each case the electronic pages are able to rotate around the central bind to allow for the electronic pages to be refreshed.

Figure 3:
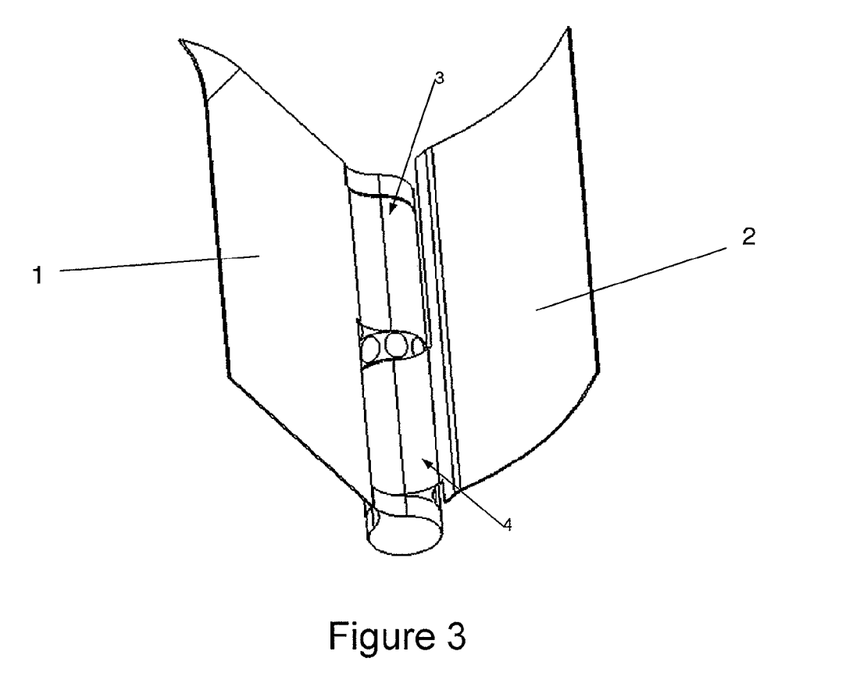
FIG. 3 illustrates the action of turning the electronic pages about the central spinal bind.

The motion of turning the pages of the e-reader enables each page to refresh as or soon after it is turned. FIG. 3 shows the action of turning the electronic pages about the central spinal bind. When the user turns the page 1 (s)he is presented immediately with the information displayed on page 2 that had been written into this display device while the user was reading page 1.

An optimal further feature of the e-reader device is that each electronic page is locked into position before said page begins the refreshing process. This feature is a benefit when a user wishes to maintain the information that has been downloaded on both the current page and the previous page(s), allowing the user to retrieve information from two or more pages.

Each page is preferably connected to the central spine as shown, wherein the connectors of each said page are positioned within a sleeve part of the rotatable section of the spine, for example on page mounts 3,4.

Figure 4:
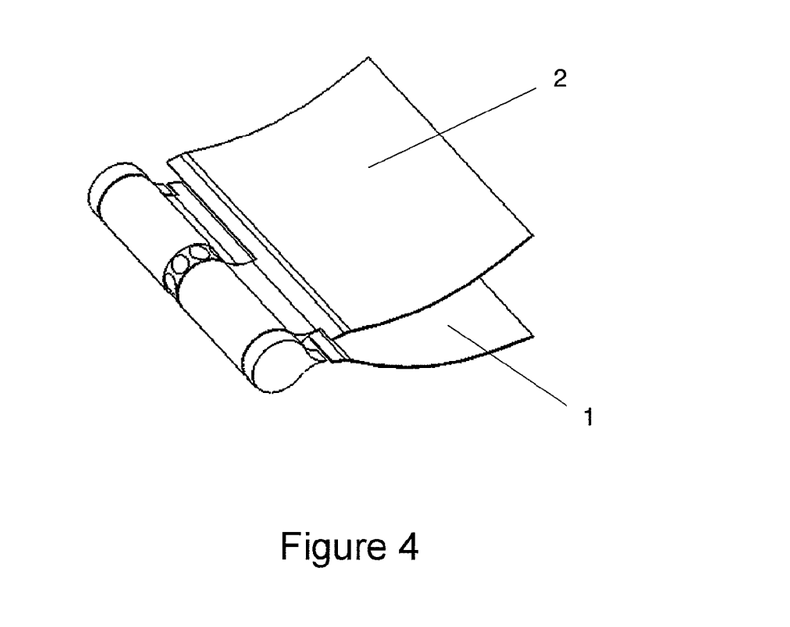
FIG. 4 shows an e-reader device after the upper page has been turned to the back, resulting in the underlying electronic page surface coming to the top of the pages.

FIG. 3 demonstrates how each page of the device is turned about the central spine. As an upper page 1 (as shown in FIG. 1) of the e-reader is turned (as shown in FIG. 3), the upper page refreshes during or shortly after the turning motion. In embodiments of the present invention this refreshing process occurs out of sight from the user due to the fact that the refreshing is completed either during the turning motion or soon after the turning of the upper page is complete. In either case, the page that is being refreshed is hidden behind the subsequent upper electronic page and so the user is not privy to the refreshing process enabling a smooth page-turning process. This feature of the e-reader is of particular importance to technology that incorporates display media that are not capable of a fast refresh rate. An example is electrophoretic-type displays such as those available from E-Ink Corporation of Cambridge, Mass., USA (see, for example, U.S. Pat. No. 5,961,804). Our technology discretely enables a low refresh rate display to refresh out of sight of the user during the turning motion of the electronic page. FIG. 4 shows the device after the upper page 1 has been turned to the back, resulting in the underlying electronic page surface coming to the top of the pages, as shown. The user is able to read text that is stored electronically using this page turning feature for sequential page reading.

There is scope for the central spinal column of the e-reader device to incorporate several features to further aid the operation of the device. An operating function, such as a main on/off operating function or a menu operating function of the device, in the form of, for example a button, may be positioned on one of the sections of the column. A convenient location for such an operating device is the upper or lower section of the bind 5, 6 shown in FIG. 5.

Figure 5:
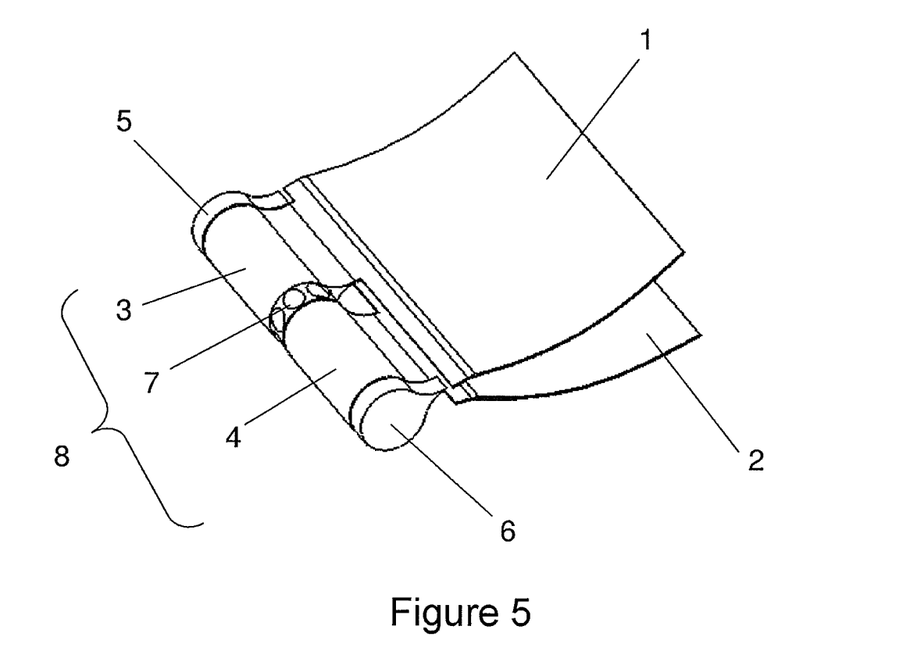
FIG. 5 illustrates a scroll wheel incorporated into the central spinal column of the device.
Figure 6:
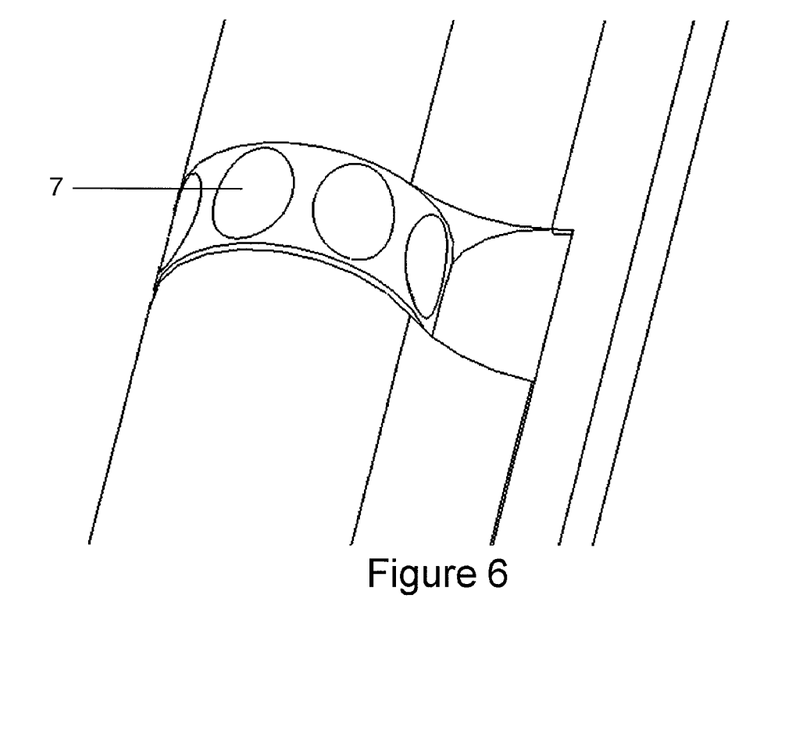
FIG. 6 shows an enlarged illustration of the scroll wheel of FIG. 5.

An optimal further feature of the device is the incorporation of a scroll wheel 7 attached at a position on the central spinal column, as shown in FIG. 5 and in more detail in FIG. 6. Such a scroll wheel may, for example, be used to allow the user to quickly locate the required book, page, document or file stored within the e-reader from a menu.

Figure 7:
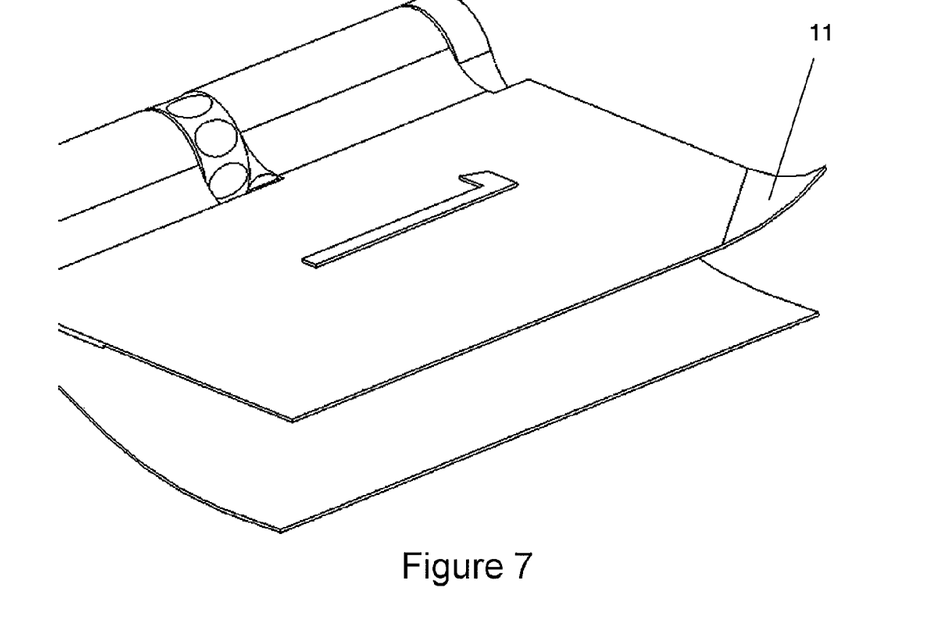
FIG. 7 illustrates an e-reader with a simulated action of folding over the corner of a page.

As mentioned above, in order to further aid the experience of reading, the e-reader preferably incorporates the addition of a touch screen display. Such a display provides the user with additional function which allows the user to be able to book mark pages of the device by simulating the action of folding over the corner of a page. The addition of touch screen capability within the e-reader device enables the user to, for example, "electronically" fold over the corner of an electronic page 11 as is illustrated in FIG. 7, in order to book mark a chosen page with a book mark symbol by touching the chosen page to be book marked, therefore allowing for easy reference when "scrolling" through the pages of the e-reader device. Once it is no longer necessary for the user to maintain the book marked page, the book mark symbol may be turned off with a further touch of the page by the user.

The user may also turn back the pages in case he wants to reread information displayed on a page that he read earlier.

Figure 8:
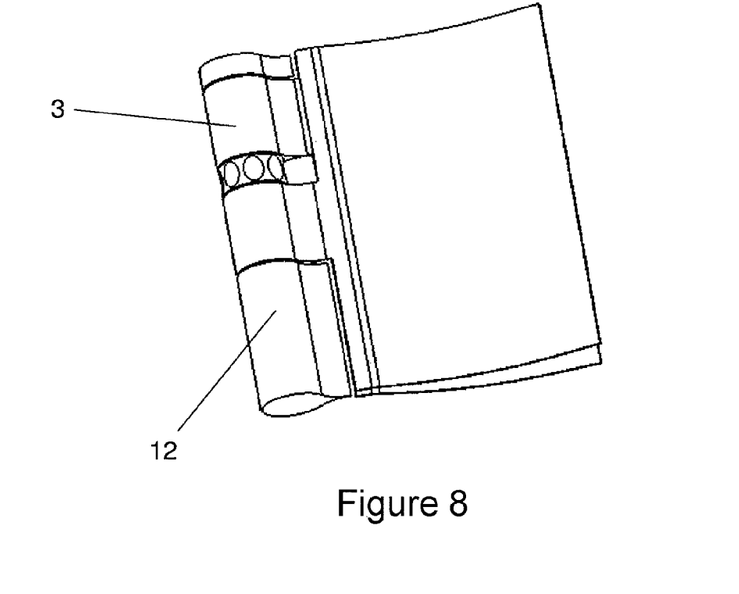
FIG. 8 shows a section of the central spine of an embodiment of the e-reader containing technology elements that are common to the electronic pages of the device.

We also incorporate the driver electronics within the e-reader device which allow each electronic display to turn about the central spinal bind and be able to carry with it, on its rotating element, electronics to send the appropriate signals to the rows and columns of the page display. The driver electronics for each of the display devices, such as the display row and column drivers, are preferably mounted in a fixed position with respect to each of the displays, preferably inside the above-mentioned sleeve part. (Additionally or alternatively some or all of the electronics may be mounted on an electronic page). Referring to FIG. 8, a host module which is running the reader software is also responsible for coordinating the information displayed on the individual page, and is preferably integrated in a fixed position with respect to one of the display devices/pages, preferably located in the central spinal column. The host module also contains most other hardware components, such as, but not limited to the battery, image processing system, common power on/off control, and download capability. The electronics that is local to each of the displays includes the image driver electronics. In embodiments a flexible interconnect cable is present for electronic signal communication between the host module and one or more of the other individual pages/display devices. The flexible interconnect is configured such that it can accommodate the 360 degree turning motion of the pages. Preferably the individual pages are mounted in such a way with respect to each other that it is not possible to turn any of the pages by multiple 360 degree turns with respect to any of the others.

Alternatively, the host module may be integrated in a fixed position with respect to the central spinal column, but turnable with respect to any of the display devices that can be rotated around the central spinal column. In this case the interconnection between the host module and the individual pages such that it is not damaged by multiple 360 degree turns. For example a wireless link (optical or radio) may be used for interconnecting the different pages of the device with the host module.

Example 2

An Electronic Reader which Incorporates at Least Two Double Sided Electronic Pages that are Electronically Refreshed Upon being Turned In this example an electronic reader is provided that incorporates two or more double-sided electronic pages bound or otherwise coupled to one another to allow turning. Upon turning each upper page of the e-reader, this page is refreshed, while the user is viewing a subsequent electronic page of the reader. Each double-sided page of the e-reader is bound together around a central spinal column. In embodiments a double-sided page comprises two display devices mounted back to back with respect to each other.

Figure 9:
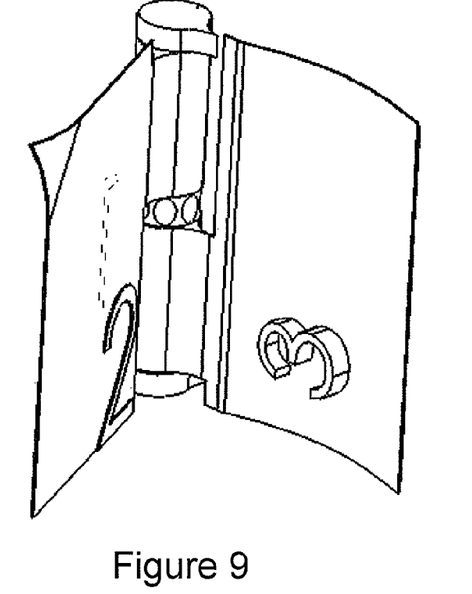
FIG. 9 shows an e-reader device wherein each page of the device comprises double-sided pages integrated together about a central spinal column bind.

As is shown in FIG. 9, each page of the device may comprises a double-sided page that is able to be turned in the same way as described above and with reference to FIG. 3. As an upper page 1 of the e-reader is turned about the central bind, said upper double-sided page 1 refreshes while page 2 and 3 become visible to the user. Both pages will have been updated prior to turning page 1. The user may turn page 1 by 180° only (or less, for example by 90° or more) at first in order to read page 2, and may turn page 1/2 by a further say 180° when (s)he wants to proceed to page 3.

As described above for the device incorporating single-sided electronic pages, our technology enables this double-sided page refreshing process to occur out of sight from the user due to the fact that the refreshing motion is completed either during the turning motion or soon after the turning of the upper page is complete.

One significant advantage of incorporating double-sided pages within the device is that in embodiments the user is able to access three consecutive pages at any one time, that is the current page as well as the page before and after the current page. The user may also turn back the pages in case he wants to reread information displayed on a page that he read earlier. Potentially, in embodiments, there are four pages concurrently available: when reading, say, the left hand page if, say, refresh is only performed on completion of a 360° turn then the user has the current page, the page before, the page after (right hand page) and, potentially (if it has refreshed), the page after the right hand page potentially available. Similarly when reading the right hand page two previous and one next page can be available.

Example 3

An Electronic Reader which Incorporates Individual Pages which are Detachable from the Main E-Reader Device Unit In an additional embodiment, an electronic reader is provided that incorporates two or more user-detachable (and re-attachable) electronic pages. Thus a page may incorporate a physical and electrical connection system that allows the page to be unplugged from (and preferably plugged back into) a reader. Upon downloading the documents information into the host module of the electronic reader, the user is then able to detach a page 1 from the main e-reader unit and share the information that has been downloaded onto said electronic page with a second user. For example, this may be most convenient where two users are interested in separate newspaper articles.

Figures 10A, 10B:
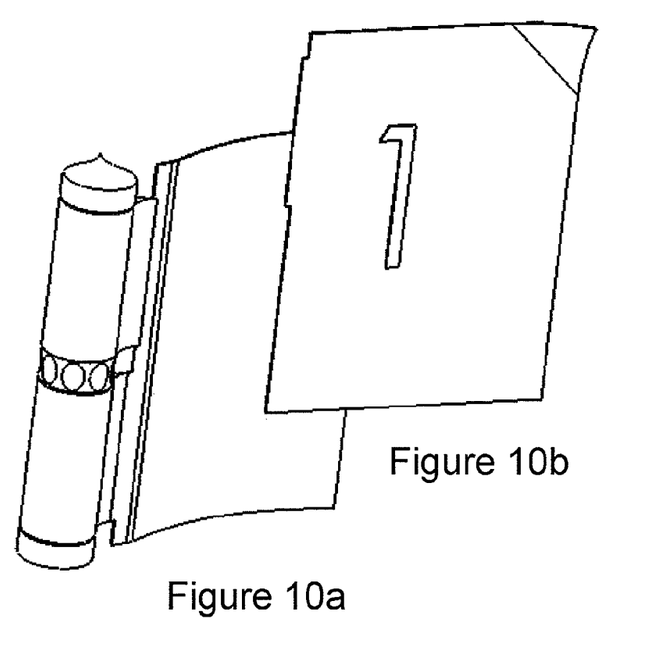
FIG. 10 illustrates an electronic reader that incorporates two or more electronic pages that are able to be detached from the main e-reader unit.

In FIG. 10, the main unit as seen in FIG. 10 a) is shown with one of the pages detached from the e-reader. This detached page is shown in FIG. 10 b). In embodiments the detached page can be read by a second reader either as a single or a double-sided page.

According to a preferred embodiment of this aspect of the invention the detachable page is not capable of being updated while being detached from the central spine column. In this case it is not necessary to integrate full image processing functions and power supply onto the detachable page. Nevertheless, it can be advantageous to integrate the row and column drivers of the display onto the detachable page, since this can reduce significantly the number of electrical connections, for example of an edge connector, that are made when reinserting the page back into the central spine column.

According to another embodiment of this aspect of the invention communication between the detachable page and electronic reader is by a wireless link. Adequate image processing and power supply functions are integrated onto the detachable page, such that the page can continue to be updated while not physically connected to the central spine column. This also facilitates reattachment of the page, since no (or very few, say just power) electrical connections need to be formed when reinserting the page into the central spine column.

Example 4

An Electronic Reader which Incorporates Two Distinct E-Reader Units that are Able to be Operated Separately and are Able to be Attached Together to Form a Single E-Reader Unit A fourth embodiment of the present invention is disclosed, wherein two electronic readers are provided that can be joined together to form a single e-reader unit, as described above. Each individual e-reader incorporates one or more single or double-sided electronic pages for example as described above. Each electronic page of the e-reader may have a connector which, when the e-readers are coupled, becomes part of a spine of the combined reader.

Figure 11A:
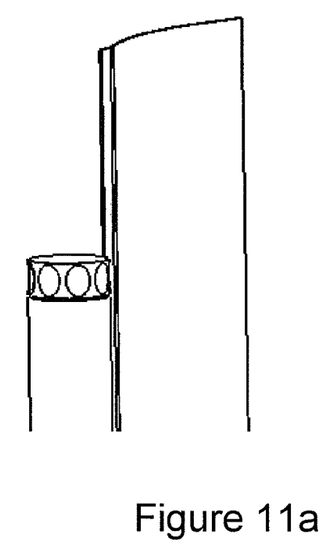
FIG. 11 shows two electronic readers that can be joined together to form a single e-reader unit.
Figure 11B:
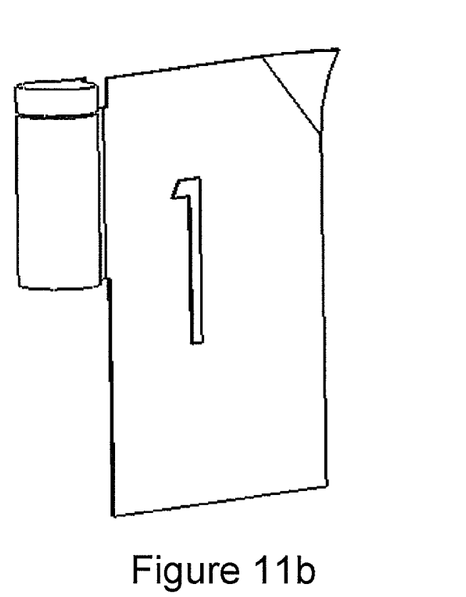

FIG. 11 shows the individual units represented by FIG. 11 a) and FIG. 11 b), each unit comprises an individual e-reader device. Each unit is preferably operable to refresh each electronic page for example by the use of a button. Therefore, each individual user is able to download and read separate material onto their unit. In order to allow each of the units to operate independently of each other, each electronic page preferably has its own driver electronics.

When the two units are joined together, then the resultant device is preferably able to operate as is described above: Each page of the resultant device is able to be refreshed either during or shortly after the turning motion of the page, as is described above and is shown in FIG. 1 and FIG. 2. Communication between the two e-readers when joined together may be via a wireless link, and/or by a physical electrical connection formed when the two e-readers are joined together.

The e-reader we describe may comprise rigid display devices, or they may comprise flexible displays that convey the touch and feel of paper in that they can be bend when turning the pages. Flexible displays on plastic or thin metal substrates are also more robust than glass based displays. The use of flexible displays within the device can in embodiments allow the individual pages of the device to be rollable. In this case, the electronic pages may be configured such that they can be rolled into the central spine in order to reduce the form factor of the electronic reader for ease of storage and transportation.

The electronic reader may have a touch screen and include a stylus. In such a device, the user may use the stylus to make annotations on the display next to the original text. These notes may be saved and stored, for example as separate files from the page containing the original text.

Figure 12:
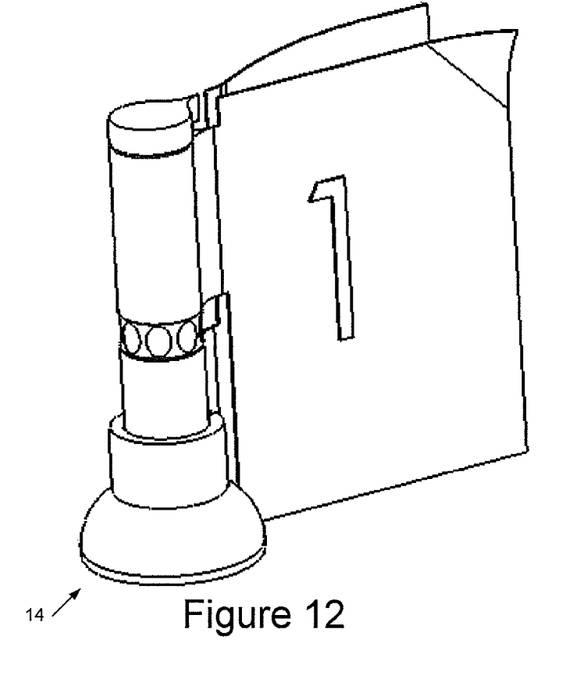
FIG. 12 shows a docking station which allows new reading material to be uploaded and the battery of the device to be recharged by the use of a USB or other interface port.

FIG. 12 shows a docking station 14, which may be used in order to upload new reading material or recharge the battery of the device. The docking station may also comprise a USB port, or other standard interface, such as a Bluetooth connection for connecting the device to a PC, mobile phone or PDA. Alternatively such communication interface can be integrated directly into the central spine unit, to enable the content of the reader to be updated even when the device is not connected to the docking station.

Figure 13:
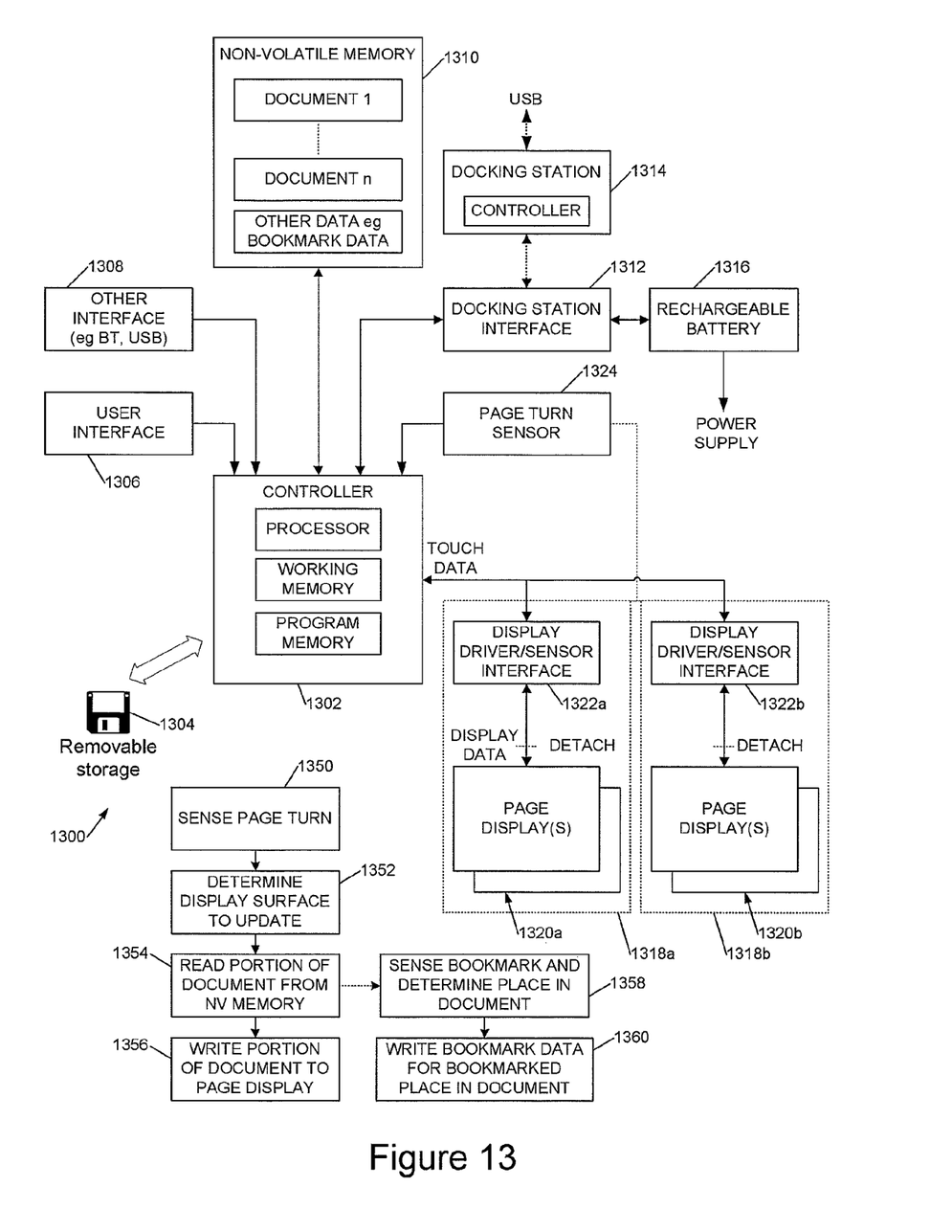
FIG. 13 shows a block diagram of an embodiment of an electronic document reading device according to the invention, including a flow diagram of a document reading procedure.

Referring to FIG. 13, this shows a block diagram of an embodiment of an electronic document reading device 1300 as described above. The device includes a controller 1302 comprising a processor coupled to working memory and permanent program memory storing program code for controlling the e-reader to function as described above. The stored code may, optionally, also be provided on a removable storage medium, illustratively shown by portable storage media 1304.

The controller 1302 is coupled to a user interface 1306 such as the scroll or menu select wheel 7 described above and optionally to one or more other interfaces 1308 such as a Bluetooth™ interface, a wireless local area network interface, a USB interface or the like. The controller is also coupled to non-volatile memory 1310, for example Flash RAM, which stores one or more documents or parts of documents, and which may additionally store other data such as bookmark data identifying the locations of one or more bookmarks within a stored document a bookmark having been placed, for example, as described above. A docking station interface 1312 is provided for interfacing with a docking station 1314 to receive data such as document data, power for recharging a rechargeable battery 1316, and optionally for outputting data such as bookmark data.

The controller is also coupled to one or more electronic pages 13, 18a, b each with one or more (single- or double-sided) page displays 1320a, b. As illustrated the electronic pages also include display driver, and optionally sensor interface circuitry 1322a, b (if a page is touch-sensitive), to interface with the controller to receive data for driving a page display surface and, optionally, to provide touch data back to the controller. The display driver circuitry may either be part of a main device or may be part of an electronic page and may, in embodiments, be fabricated on a page surface (in embodiments on a flexible page surface by solution deposition techniques) according to the application. Fabricating some or all of the driver/interface electronics on a display surface can potentially reduce a number of electrical connections to a page, which may be advantageous. Suitable solution deposition techniques which may be employed to fabricate driver/interface electronics are described in a number of the present applicant's previous patent applications, for example WO 01/47045, WO 2004/070466, WO 01/47043, WO 2006/059162, WO 2006/056808, and WO 2006/061658, all hereby incorporated by reference in their entirety. A page turn sensor 1324 is preferably sensitive to rotation of one of the electronic pages 1318a, b with respect to the other in order to sense page turning by a user of the device.

The code stored in the program memory of controller 1302 comprises operating system code, code to implement user interface 1306, the other interfaces 1308, 1312, page turn sensing code, touch sensing code and display driving code. In particular the program memory includes code to sense a page turn 1350, to determine a display surface to update 1352 in response, and code to then read 1354 a portion of document from the non-volatile memory and to write 1356 this to the display surface to be updated. Preferably code is also included to sense 1358 a bookmark at a position in the displayed document and to write 1360 the bookmark to the non-volatile memory.

As an additional feature, a reading light may be incorporated within the device; this may or may not be detachable from the e-reader device. In embodiments an e-reader as described above may be at least partially solar powered.

The present invention is not limited to the foregoing examples. For example, the described e-reading devices are not restricted to documents in a particular language and may be employed with languages with, for example, a different script reading and page turning direction, such as Arabic. Aspects of the present invention include all novel and inventive aspects of the concepts described herein and all novel and inventive combinations of the features described herein.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. An electronic document reading device, the device comprising:
    first and second electronic pages each having at least one display surface;
    a page support, each said first and second electronic page being attached to said page support such that said first and second pages are physically turnable and wherein said second electronic page is arranged behind said first electronic page so that said first electronic page is an upper page, said second electronic page is an underlying page and said at least one display surface of both said first and second electronic pages comprises an upper display surface;
    a memory to store at least part of a document to be read;
    a page driver coupled to said memory, to drive said at least one display surface of said first electronic page to display a first stored portion of said document;
    a sensing system to sense turning of said first electronic page by sensing a predetermined turning angle of at least 100° of said first electronic page relative to said second electronic page; and
    an update control system coupled to said sensing system to control update of said at least one display surface of said first electronic page with a second stored portion of said document responsive to sensing of said turning of said first electronic page; and
    wherein said update control system is configured to control said updating based on said sensed predetermined turning angle such that said updating of said at least one display surface of said first electronic page occurs while a user of the device is viewing said at least one display surface of said second electronic page which has become an upper page as a result of the turning of the first electronic page.

2. An electronic document reading device as claimed in claim 1 wherein said sensing system is configured to sense substantial completion of said turning of said first electronic page such that said first electronic page lies substantially behind said second electronic page, and wherein said update control system is configured to control update of said first electronic page lying behind responsive to sensing of said substantially complete turning of said first electronic page.

3. An electronic document reading device as claimed in claim 1, wherein said first electronic page has two said display surfaces on opposite sides of said first electronic page to thereby provide a double-sided electronic page.

4. An electronic document reading device as claimed in claim 3 wherein said two display surfaces comprise the upper display surface and a reverse display surface, and wherein said update control system is configured to control update of at least said upper display surface responsive to said turning sensing.

5. An electronic document reading device as claimed in claim 1 wherein said page support comprises first and second page mounts configured to enable rotation of one said mount with respect to the other, said first mount mounting said first electronic page and said second mount mounting said second electronic page.

6. An electronic document reading device as claimed in claim 5 wherein said sensing system is configured to sense said rotation.

7. An electronic document reading device as claimed in claim 5 wherein each of said first and second page mounts includes electronics associated with said page mounted on said mount, and said page support further comprises a flexible electrical interconnect linking said electronics in said first and second page mounts, and wherein said interconnect is configured to allow relative rotation of said first and second page mounts by at least 300°.

8. An electronic document reading device as claimed in claim 5, wherein at least one of said first and second electronic pages is detachable.

9. An electronic document reading device as claimed in claim 8 wherein a display on said at least one display surface of said detachable page is non-volatile.

10. An electronic document reading device as claimed in claim 1 wherein said page support comprises at least one user control.

11. An electronic document reading device as claimed in claim 1 wherein said page support contains active electronic components to drive said at least one display surfaces of said first and second electronic pages.

12. An electronic document reading device as claimed in claim 1 wherein said at least one display surfaces of said first and second electronic pages comprises an electrophoretic display.

13. An electronic document reading device as claimed in claim 1 wherein said first and second electronic pages comprise a flexible electronic page.

14. An electronic document reading device as claimed in claim 1 wherein one or more rigid electronic components of one or more of said memory, page driver, sensing system and update control system are integrated into said page support.

15. An electronic document reading device as claimed in claim 1 wherein at least one of said first and second pages has a touch sensitive screen.

16. An electronic document reading device as claimed in claim 1 wherein at least one of said first and second pages includes a sensor to sense a bending force on a corner of the page, and wherein said reading device further comprises a bookmarking system to bookmark a location in a displayed document responsive to detection of said bending force.

17. An electronic document reading device as claimed in claim 1 further comprising an interface to a docking station, and configured to perform one or both of uploading a said document and recharging an internal power source when interfaced to said docking station.

18. A detachable electronic page for an electronic document reading device, said electronic page having an electrical interface for interfacing with said reading device and a connecting portion for detachable coupling with said reading device and wherein said page is flexible so that user is able to bookmark a document displayed on said electronic page by applying a bending force to cause said electronic page to bend.

19. A detachable electronic page as claimed in claim 18 wherein said page has a display surface comprising an electrophoretic display, and wherein said page lacks an internal power supply.

20. An electronic document reading device, the device including at least one electronic page having a display, and wherein said device is configured such that a user is able to bookmark a document displayed on said electronic page by applying a bending force to a corner of said page to cause said electronic page to bend.

21. A docking station for the electronic document reading device of claim 1, the docking station including an interface for said reading device, and wherein the docking station is configured to perform one or both of uploading a document to said reading device and recharging an internal power source of said reading device.

22. A method of updating a first display on a first turnable page of an electronic document reading device having at least first and second pages wherein said second page has a second display and is arranged behind said first page so that said first page is an upper page and said second page is an underlying page and said first display is on an upper surface of said first turnable page and said second display of said second page is on an upper surface of said second page, the method comprising:

driving said first display to display a first stored portion of a document;

sensing, using a sensing system, turning of said first page by sensing a predetermined turning angle of at least 100° of said first page relative to said second page; and updating, using an update control system, said first display of said first page to display a second stored portion of said document in response to said sensing of predetermined angle; and wherein said updating of said first display on said first page occurs while a user of said electronic reader is viewing said second display on said second page which has become an upper page as a result of the turning of the first page.

23. A method as claimed in claim 22 wherein said device has at least two pages and wherein said sensing determines when one of said pages is substantially hidden behind the other.

24. A non-transitory carrier carrying processor control code to, when running, implement the method of claim 22.

25. An electronic reader comprising at least first and second electronic pages connected to a spine wherein said second page is arranged behind said first page so that said first page is an upper page and said second page is an underlying page and wherein said first and second electronic pages are turnable about said spine, and wherein upon turning of said first page by a predetermined angle of at least 100° relative to said second page about said spine said first electronic page updates; said electronic reader being arranged such that said update of said first page occurs while a user of said electronic reader is viewing said second page which has become an upper page as a result of the turning of the first page.

26. An electronic reader as claimed in claim 25 wherein each of said pages is turnable through substantially 360° to lie behind the other.

27. An electronic reader as claimed in claim 26 wherein said first page updates upon turning of said first page through substantially 360°, whereby said update is substantially hidden from a viewpoint of a user of said electronic reader viewing the page.

28. An electronic reader comprising at least first and second double-sided electronic-pages connected to a spine wherein said second double-sided page is arranged behind said first double-sided page and each double-sided electronic page has a display on each opposed side of the page; and a page turn sensor to sense turning of said first page by sensing a predetermined turning angle of substantially 360° of said first page relative to said second page and wherein, responsive to sensing said predetermined turning angle, said reader is configured to display reading matter on a first side of said first double-sided electronic page whilst updating a second, reverse side of said first double-sided electronics page when said second reverse side is facing a user and lies behind said second double-sided electronic page.

29. An electronic reader as claimed in claim 28 wherein each said electronic page is flexible.

30. A device as claimed in claim 1 comprising an active matrix of organic thin film transistor (TFTs) on an organic, flexible substrate which drives an electrophoretic medium.

31. A page as claimed in claim 18 comprising an active matrix of organic thin film transistor (TFTs) on an organic, flexible substrate which drives an electrophoretic medium.

32. A reader as claimed in claim 20 comprising an active matrix of organic thin film transistor (TFTs) on an organic, flexible substrate which drives an electrophoretic medium.

33. An electronic document reading device as claimed in claim 10 wherein said at least one user control comprises a wheel.

\* \* \* \* \*